UNITED STATES PATENT OFFICE.

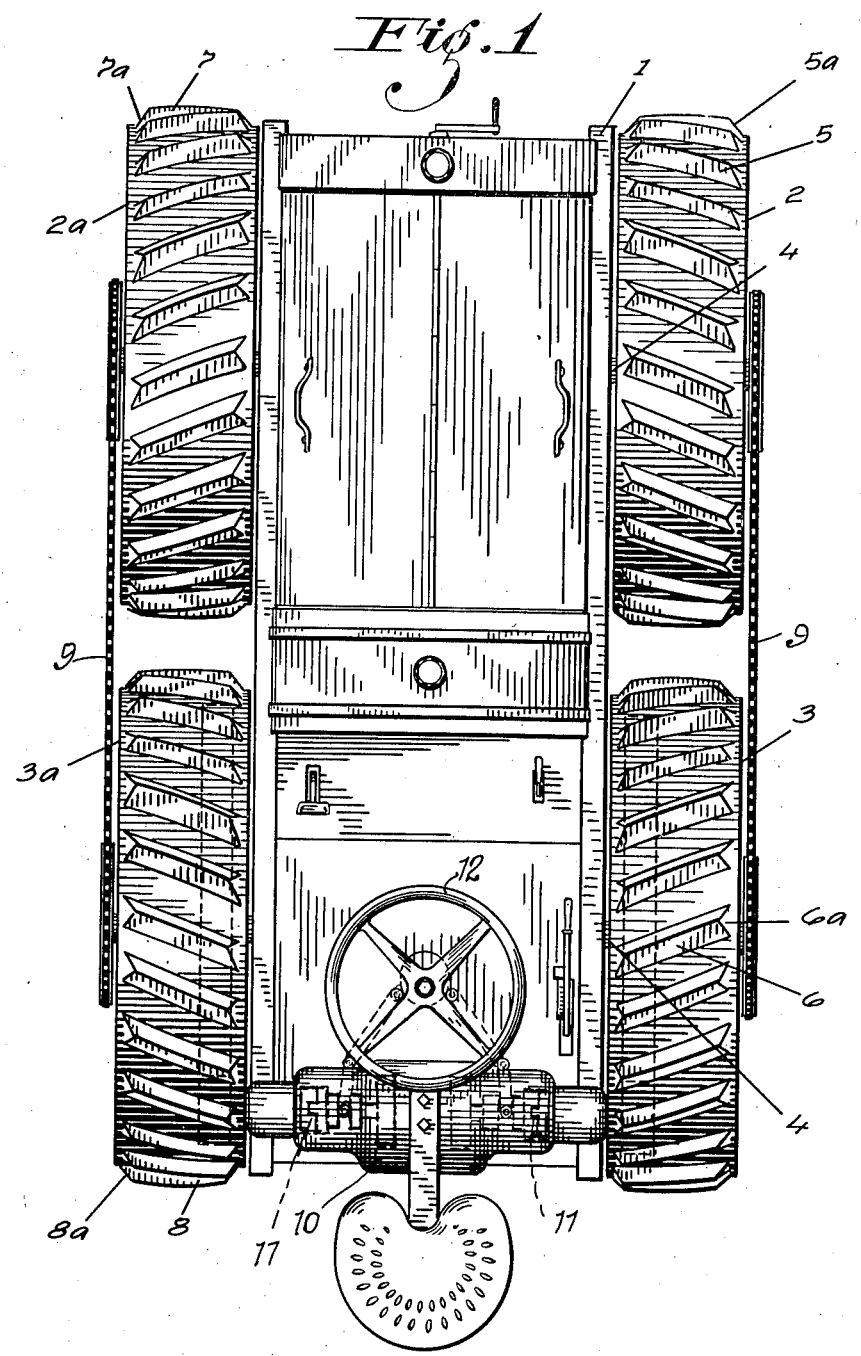

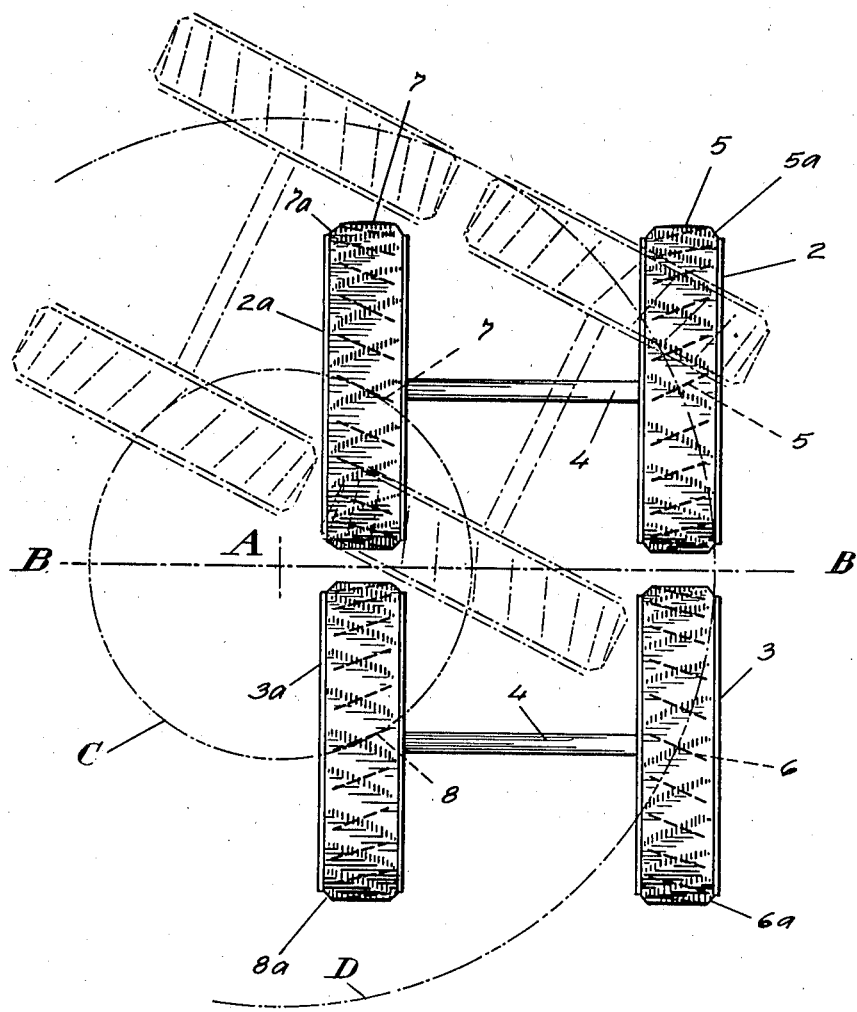

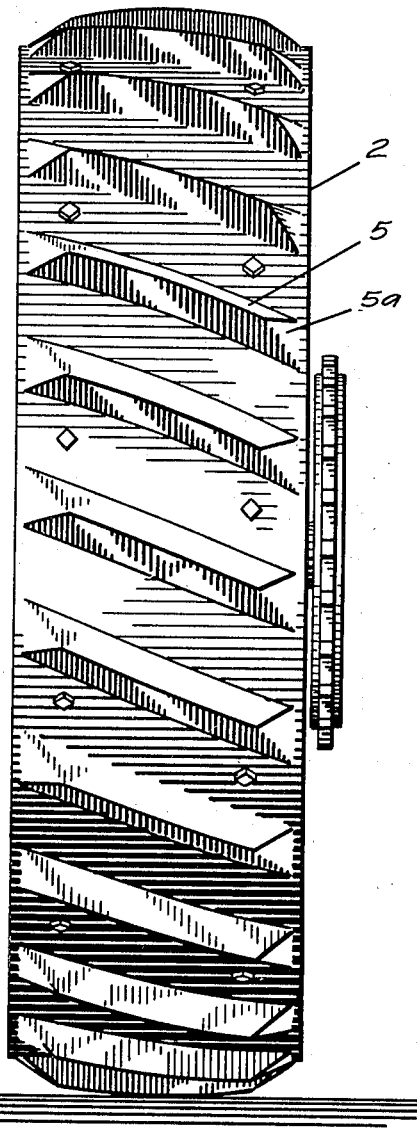

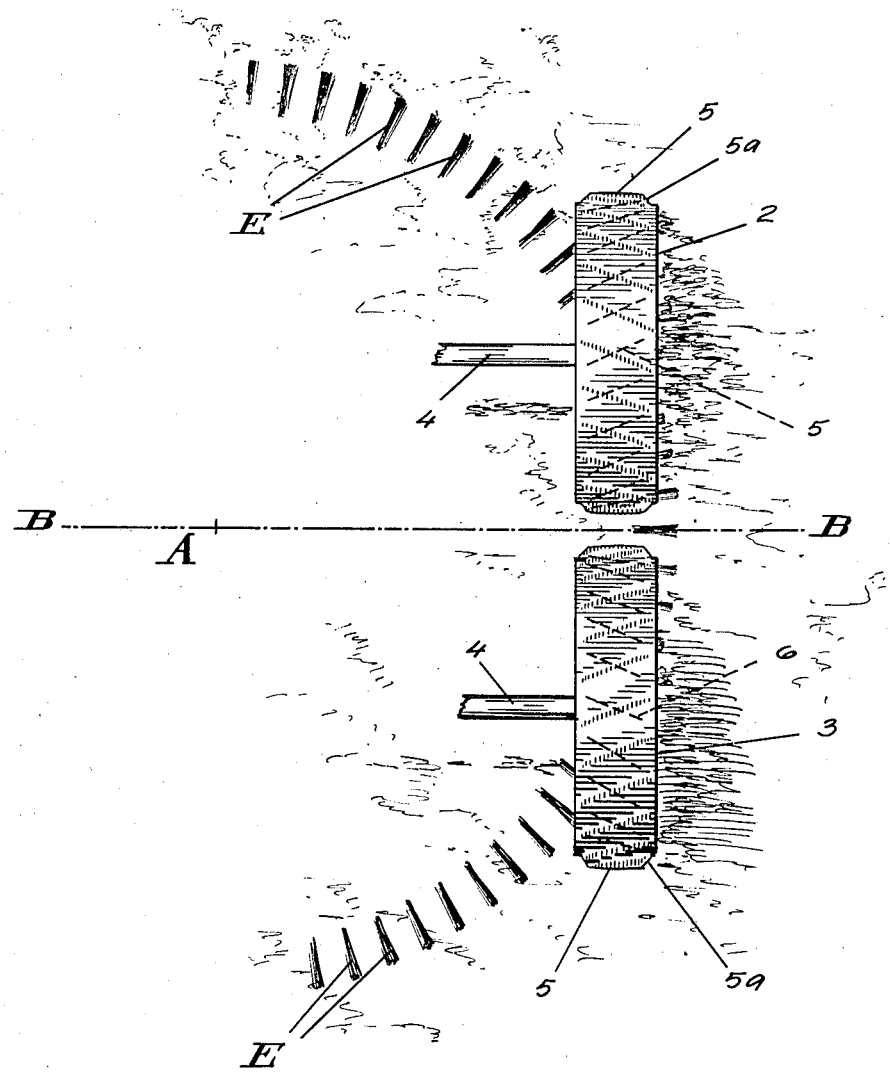

JOHN MINOR KROYER, OF STOCKTON, CALIFORNIA.

TRACTOR.

1,308,790.   Specification of Letters Patent.   Patented July 8, 1919.

Application filed May 6, 1918. Serial No. 232,703.

*To all whom it may concern:*

Be it known that I, JOHN MINOR KROYER, a citizen of the United States, residing at Stockton, in the county of San Joaquin, State of California, have invented certain new and useful Improvements in Tractors; and I do declare the following to be a clear, full, and exact description of the same, reference being had to the accompanying drawings, and to the characters of reference marked thereon, which form a part of this application.

The object of the present invention is to produce a round wheel tractor which will have all the advantages of the endless track laying type and at the same time have none of the many objectionable features now common to that type. The structure of the various features of my improved tractor is being made the subject matter of independent applications for patent and this present invention relates to the dirigible feature thereof.

I aim to construct the tractor so as to provide a driving and pulling force on all the wheels with a means, controllable by such driving means, for permitting the machine to be turned in arcs, the radii of which may be less than the length of the machine and from that up to any length desired by the operator according to the conditions under which the machine may be working. This will permit the machine to be turned easily in close quarters as in vineyard and orchard work and the like. I further so construct the treads of the wheels that the turning operation may be carried out with the very minimum amount of lateral strain on the wheels or machine as a whole. In fact, the same can be turned as though freely pivoted for the purpose with the inclusion of a "geared to the ground" driving force.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a top plan view of a tractor showing my improved driven and turning wheel construction thereon.

Fig. 2 is a diagrammatic view which I will utilize in explaining the dirigibility of the tractor.

Fig. 3 is a side elevation of one of the wheels showing the particular relation of the grip construction to the horizontal ground surface.

Fig. 4 shows, in diagrammatic outline, the "geared to the ground" effect of the driving wheels when the tractor is describing its turning movement.

Referring now more particularly to the characters of reference on the drawings, the numeral 1 designates the chassis or frame of the tractor which is horizontally and vertically rigid for its entire length. On this chassis or frame is mounted any suitable power unit, controls and transmission mechanism (not shown). The two front wheels 2 and 2$^a$ and the rear wheels 3 and 3$^a$ are mounted on axles 4 which are fixed rigid against any lateral turning movement relative to the chassis 1. Thus it will be noted that none of the wheels can be used as steering wheels, *per se*, independently of the tractor as a whole, but when a turning movement is to be imparted to the tractor, the wheels, frame and entire operative parts of the same must turn as a rigid unit. This, however, is so accomplished as not to cast any undue lateral strain upon the parts but the whole operation is directed and carried out with a pivot like movement induced primarily by the peculiar construction and arrangement of the treads of the wheels which I will now describe:

On the tread of the wheel 2 are arranged a plurality of grips 5 of a desired width of projection beyond the flat tread of the wheel, which width of projection is constant for the full length of the grips. The importance of this constant width will develop as this description is proceeded with. These grips 5 are set at an angle of approximately twenty degrees to the side edges of the wheel 2. This degree of angle is that at which the lowermost grip will extend radially with respect to the practical center "A" of the smallest circle to be described by the tractor in turning when the wheel 2 is on the outer side of such circle. See Fig. 2 in which the heavy dash lines are indicative of the grips on the underside of the wheel.

The grips 5 are swaged off at their ends at an angle of about forty-five degrees, as at 5$^a$. Since the grips have the same width of projection from end to end and angle with respect to the edges of the wheel, this forces them to have a slight curvature between the swaged ends due to the annulus of the wheel. Thus as the grips engage the horizontal ground they do not engage the same in parallel relation, wherein the whole length of the same would rest on the ground at once, but they rest at all times at a tangent to such horizontal surface (see Fig. 3). Hence from the point of contact the grips curve upwardly at each end thereof. The reason for this will presently develop.

On the wheel 3 are grips 6—6ª of the same structure as the grips 5—5ª. These grips 6—6ª are, however, set at the reverse angle of inclination to that of the grips 5—5ª. This is necessary to maintain the bottom grip 6 in radial relation to the center "A" when the wheel 3 is on the outside of the circle of travel since the wheel 3 is to the rear of the transverse center line B—B through the machine which forms the constant diameter of the circle of movement of the machine.

On the wheel 2ª are grips 7—7ª and on the wheel 3ª are grips 8—8ª, both of the same construction as the grips 5—5ª. The angle of inclination of the grips 7—7ª and 8—8ª is the reverse to that of the grips 5—5ª and 6—6ª, respectively, since when the wheels 2ª and 3ª are on the inside of the circle of movement, the grips 7—7ª and 8—8ª must be tangent to such circle of movement instead of radial thereto, as are the grips 5—5ª and 6—6ª, for a reason as will appear in the description of operation which will follow. A vice-versa condition exists when the wheels are in the reverse position with respect to the circle of movement. Since each of the wheels has no independent lateral motion with respect to the others, they may all be connected for rotary motion as a unit by suitable mechanism as for instance chains 9 (or by special structure to be made the subject matter of a separate application for patent). Also, by mechanism common to the art, or, by special mechanism which will be made the subject of another application for patent by me, power may be applied to the wheels by transmission, clutch and brake means thereby allowing the wheels on one side or the other of the machine to be locked entirely, or partly, against rotation.

As one example of how this can be done, see Fig. 1, where 10 indicates a common transmission gearing connected in driving relation with the power unit and the rear wheels. Such transmission has a clutch 11 on each side thereof arranged to be operated by the wheel 12 whereby the front and rear wheels at one side of the frame may be released from the driving means without releasing those on the opposite side. As indicated above, however, there are many ways in which this may be done, so I do not enter, at this time, into a detailed description of nor lay claim to any specific means since my peculiar transmission mechanism used for the purpose will appear in said separate application for patent, as above indicated.

Referring now to Fig. 2 of the drawings, I will explain in detail the operation of the device in its turning movement. I will assume, for the purpose of this description, that the wheels 2ª and 3ª are the ones which are locked against rotation while the wheels 2 and 3 are the ones to which the power will be connected to rotate them and impart the turning movement to the tractor. Under these conditions then the wheels 2ª and 3ª will be on the inner side of the circle of movement while the wheels 2 and 3 will be on the outside thereof. The theoretical center of the circle of movement would then be directly between the wheels 2ª and 3ª, but I have found by experiment that the practical center is at "A." (See Fig. 2.) Taking, then, the center "A" and drawing two circles "C" and "D", the first through the lowermost grips 7—7ª and 8—8ª, and the second through the lowermost grips 5—5ª and 6—6ª, it will be seen that the nonrotating grips 7—7ª and 8—8ª lie tangent to the circle of movement while the rotating grips lie radially of the center of such circle of movement. Thus as the rotation of the wheels 2 and 3 drives the tractor in its turning movement, the lowermost grips 7—7ª and 8—8ª act as sled runners or leaders to direct the pivotal movement of the tractor without undue lateral strain or drag. The swaged ends 7ª and 8ª plus the curvature of the grips from their tangential contact with the horizontal surface of the ground carry out this scheme of sled runner movement to the maximum degree.

While this sled like skidding effect is thus obtained for the non-rotating wheels, the directly opposite effect is had on the rotating driving wheels, as is of course very essential. This is carried out by the reversal of the position of the grips, whereby the grips 5—5ª and 6—6ª extend radially of the center of movement "A" and thus as the wheels 2 and 3 rotate they are vertically "geared to the ground". (See Fig. 4.) The advance of the wheel 2 causes the lowermost grips 5—5ª to make gear like impressions "E" in the ground. These impressions are all radially disposed with respect to the center "A". Thus the lowermost grips 6—6ª being also radially disposed with respect to the center "A", will fit into these impressions much as gear teeth of a beveled gear would engage the teeth of a spur wheel, thus giving the "geared to the ground" effect.

The above illustration is, of course, of the theoretical perfect action of the parts. Under the varying conditions of the ground surface the action may also vary slightly but the same relative results are obtainable.

To increase the diameter of the circle of movement, the inside wheels, by clutch control, may be allowed a small relative rotation. This, then, will increase the size of the circle of movement but the general operation and functioning of the parts will still be present in the relation above described.

While I have described in detail the operation of the parts in making a forward turn to the left hand of the machine, the same results will be had in making forward or backward turns in any direction. This is made possible by the peculiar alternating arrangement of the grips on the several wheels.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. A tractor including a frame horizontally rigid for its entire length, ground wheels mounted for rotary movement relative to the frame, and grips on the peripheries of the wheels, those grips on one front wheel being arranged in reverse position to those on the other front wheel, and those on each rear wheel being arranged in reverse relation to those on the adjacent front wheel.

2. A tractor comprising a frame, and wheels arranged in consecutive order and supporting the frame, all the wheels being held against lateral movement relative to the frame whereby, to steer the tractor, the wheels and frame must move laterally as a rigid unit, and grips mounted on the wheels, such grips being so positioned that when the tractor is turned in one direction the grips on the wheels on the inside of the circle of movement will be tangent to such circle of movement and those on the outside wheels will extend radially of the center of such circle of movement.

3. A tractor including a frame horizontally rigid for its entire length, ground wheels mounted for rotary movement relative to the frame, and grips on the peripheries of the wheels, those grips on one front wheel being arranged in reverse position to those on the other front wheel, and those on each rear wheel being arranged in reverse relation to those on the adjacent front wheel, all the grips extending at an angle of about twenty degrees to the vertical edges of the wheels.

4. The combination with a tractor of the four wheel drive type, the wheels of which have no independent lateral movement, of leader grips arranged on the wheels, the grips being angularly applied and beveled at their ends whereby the tractor may be steered in short turns without any forward or backward movement of the tractor.

In testimony whereof I affix my signature in presence of two witnesses.

JOHN MINOR KROYER.

Witnesses:
GERADINE WARNER,
VIVIAN MORRIS.